United States Patent Office 3,437,517
Patented Apr. 8, 1969

3,437,517
FORMING GLASS FIBER WITH COMBINATION RESIN COATING
George E. Eilerman, Ross Township, John A. Sanguigni, Robert L. Kolek, and James J. Fasnacht, Shaler Township, and Donald E. McWilliams, O'Hara Township, Pa., assignors to PPG Industries, Inc., a corporation of Pennsylvania
No Drawing. Continuation-in-part of application Ser. No. 282,719, May 23, 1963. This application Mar. 21, 1966, Ser. No. 535,683
Int. Cl. C03c 25/02; B44d 1/14
U.S. Cl. 117—126          4 Claims

ABSTRACT OF THE DISCLOSURE

Glass fibers for reinforcing resins and rubber having a sizing thereon of a binder of a reaction product of a partial ester of a carboxylic acid and a compound containing more than one epoxy group per molecule, a coupling agent and a lubricant which fibers are prepared by applying an aqueous size of the foregoing composition as the fibers are withdrawn from the fiber forming bushings.

---

This is a continuation-in-part of application Ser. No. 282,719, filed May 23, 1963, now abandoned. The present invention relates to a glass fiber treatment and it has particular relation to the use of a novel size for treating glass fibers which are to be used in various forms as a reinforcement for resinous and rubber products.

A glass fiber strand is composed of a multitude of fine glass filaments which are formed by being drawn at a high rate of speed from molten cones of glass located at the tips of small orifices in a bushing such as shown in U.S. Patent No. 2,133,238. During formation, the filaments are coated while moving at a speed of the order of 5,000 to 20,000 feet per minute with a size which contains a binder to give the strand integrity for workability for any standard textile or reinforcement use. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers substantive and compatible with the particular resins which they are to be employed. The coupling agents greatly increase the dry and wet physical strengths of the glass fiber resin laminate.

When the glass fibers are used in the form of strand, i.e., roving or chopped strand or twisted strand, for resin enforcement, the coupling agent is usually combined with the size and applied with the size to the fibers during their formation. The size employed is usually an aqueous dispersion of a film forming, synthetic binder, and a glass fiber lubricant. Roving is formed by combining a number of strands, in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is therefore necessary that the strand have good integrity and resistance to fuzzing during the steps employed to make the twisted strand or roving and fabricate them into forms suitable for use as a resin reinforcement.

It is desired that a treatment be provided for glass fiber roving which will render the roving capable of providing increased strength to glass fiber resin laminates in general and not just to laminates of specific resins. For example, it is desired that a roving be provided which is equally useful as a reinforcement for styrenated polyester resins, epoxy resins, natural rubber and synthetic rubbery polymers. It is obvious that such a versatile roving will reduce the storage and inventory problems of both manufacturers and users of the roving.

An object of this invention is to provide glass fiber roving which has been treated with a size with good "wet-out" properties. It is desirable in the formation of glass fiber laminates that the resin completely impregnate the strand and wet the surfaces of the fibers as quickly as possible in order to reduce the time required to make the laminates as well as to provide a laminate with maximum possible strength.

It is another object of this invention to provide a glass fiber strand which is treated with a size and which can be twisted, plied and woven into cloth for use with a resin reinforcement without requiring heat cleaning and finishing of the cloth prior to such use as required when the glass fibers have been sized with starch.

It is a further object of this invention to provide an improved glass fiber sizing composition for use in sizing glass fibers for resin reinforcement which size imparts high physical strengths to glass fiber reinforced resinous articles.

It is an object of this invention to provide a rubber coated glass fiber strand, yarn or textile fabric for reinforcement of rubber. The rubber coated glass fiber reinforcement should adhere well to the rubber matrix at high and low temperatures and should have long life and good strength under severe flexing conditions.

These, and other objects, are accomplished by the practice of this invention which, briefly, comprises treating glass fiber strands during their formation with an aqueous size containing from about 1 to about 8 percent by weight of a binder obtained by reacting a partial ester of a polycarboxylic acid which contains at least one unesterified carboxyl group with a compound containing more than one epoxy group; from about 0.1 to about 2 percent by weight of a coupling agent; and from about 0.1 to about 1 percent by weight of a glass fiber lubricant. Thereafter, the strand, as such, or as yarn, cord or a fabric, is incorporated as a reinforcement in resinous or rubber articles.

The partial ester of a polycarboxylic acid which contains at least one unesterified carboxyl group may be obtained by reacting a mole of a polycarboxylic acid or anhydride containing $n$ carboxyl groups with less than $n$ moles of a monohydric compound, $n$ being a whole number greater than one. Thus, if the polycarboxylic acid contains three carboxyl groups, one mole of this acid can be reacted with one or two moles of a monohydric compound in order to esterify some of the carboxyl groups and result in a product having at least one unesterified carboxyl group.

Polycarboxylic acids which may be used in preparing a polycarboxylic partial ester which contains one unesterified carboxyl group include, for example, oxalic, malonic, succinic, glutaric, adipic, pimelic, suberic, azelaic, sebacic, maleic, fumaric, itaconic, citraconic, mesaconic, muconic, 1,2-cyclohexanedicarboxylic, 1,4-cyclohexanedicarboxylic, malic, tartaric, phthalic, isophthalic, terephthalic, tetrahydrophthalic, tetrachlorophthalic and tricarballylic acids and the corresponding known acid anhydrides of the above acids. The term "acids" as used hereinafter and in the claims shall include the acid anhydrides where they exist.

Polycarboxylic acids which may be used in preparing a polycarboxylic partial ester which contains one or more unesterified carboxyl groups include hemimellitic, trimellitic, trimesic, prehnitic, mellophanic, pyromellitic, benzene pentacarboxylic, mellitic, citric, aconitic and oxalocitraconic acids. Also included are the adducts, such as Diels-Alder adducts, of maleic, fumaric, chloromaleic, dichloromaleic, itaconic, citraconic, muconic, aconitic and oxalocitraconic acids, and their corresponding anhydrides where such exist, with conjugated and nonconjugated compounds such as rosin, rosin acids, linseed oil, linoleic acid, linolenic acid, eleostearic acid, tung oil, oiticia oil, soybean oil, dehydrated castor oil, alpha terpinene, allocimene, ocimene, myrcene, beta phellandrene and other like materials sometimes known as extenders.

Monohydric compounds which may be used in the preparation of the polycarboxylic partial ester which contains at least one unesterified carboxyl group include aliphatic alcohols such as methyl alcohol, ethyl alcohol, butyl alcohol, lauryl alcohol, etc.; partial ethers of polyhydric compounds containing one unetherified hydroxyl group such as monoalkyl ethers of glycol and polyglycols, dialkyl ethers of glycerol, etc.; partial esters of polyhydric compounds containing one unesterified hydroxyl group such as monoalkyl esters of glycol and polyglycols, dialkylesters of glycerol; aromatic monohydric compounds such as phenol, benzyl alcohol, α-naphthol, β-naphthol, etc. In the preferred embodiment of this invention, the monohydric compound is a glycol monoalkyl ether such as, for example, ethylene glycol monomethyl ether, ethylene glycol monoethyl ether, ethylene glycol monoisobutyl ether, 1,3-propylene glycol monopropyl ether, 1,4-butylene glycol monoethyl ether, 1,6-hexanediol monolauryl ether, diethylene glycol monoethyl ether, triethylene glycol monoethyl ether, higher polyethylene glycol monomethyl ethers, etc. It has been found that the presence of a glycol monoalkyl ether group in the binder molecule imparts improved water solubility or water dispersibility to the binder.

The binder which is to be used in the size composition is obtained by reacting the partial ester of a polycarboxylic acid which contains one or more unesterified carboxyl groups with a compound containing more than one epoxy group, i.e., more than one group in which an oxygen atom is attached to adjacent carbon atoms

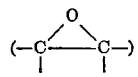

Such compounds are well known in the art and may be either monomeric or polymeric.

One group of polyepoxy compounds which may be used is obtained by the reaction of a stoichiometric excess of an epihalohydrin such as epichlorohydrin with a polyhydric phenol such as bis(4-hydroxyphenyl)-2,2-propane, bis(hydroxyphenyl)methane (obtained by the acid condensation of 2 moles of phenol with one mole of formaldehyde), hydroquinone, resorcinol, etc., or with a polyhydroxy alcohol such as glycol polyethylene glycol, sorbitol, glycerol, etc. Such compounds are characterized by the presence of terminal epoxy groups. These compounds are further described in U.S. Patents 2,324,483; 2,444,333; 2,494,295; 2,500,600 and 2,511,913 the disclosures of which are incorporated herein by reference. By varying the proportions of the epihalohydrin and the polyhydroxy compound, and/or by varying the reaction conditions, compounds of low, intermediate or higher molecular weights may be produced which range from liquids to solids. Some commercially available compounds of this type and their characteristics are listed below:

| Resin | Epoxide equivalent | Approximate molecular weight | Viscosity | Melting point, °C. |
|---|---|---|---|---|
| Epon 812 | 140-160 | 306 | 1-2 poises | Liquid |
| Epon 828 | 192 | 390 | 100-160 poises | 8-12 |
| Epon 834 | 230-280 | 470 | 4-9 poises | 20-28 |
| Epon 1001 | 425-550 | 900 | Solid | 64-76 |
| Dow 2337 | 374-415 | 800 | 200 poises | Liquid |

Other polyepoxy compounds which may be used include epoxylated novolaks, epoxidized polyolefins, epoxidized polybutadiene and other epoxidized diene polymers, butadiene diepoxide, diglycidyl esters of dicarboxylic acid (e.g., diglycidyl phthalate), etc.

A preferred class of compounds which contain more than one epoxy group per molecule comprises diepoxy compounds containing at least one fused ring epoxy group, i.e., at least one of the epoxy groups being attached to adjacent carbon atoms which are located in a carbocyclic structure. Representative examples of such compounds and U.S. patents which disclose these compounds are listed below. The disclosures of all of the cited U.S. patents are incorporated herein by reference.

I. Compounds having the general formula:

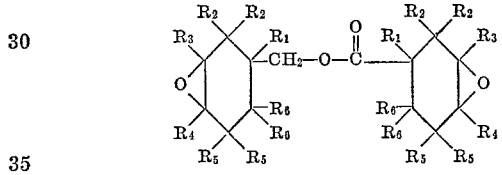

wherein $R_1$, $R_2$, $R_3$, $R_4$, $R_5$ and $R_6$ represents a hydrogen atom or an aliphatic hydrocarbon radical. Examples of such compounds, which are disclosed in United States Patent 2,716,123, include 3,4-epoxycyclohexylmethyl-3,4-epoxycyclohexanecarboxylate; 3,4-epoxy - 1 - methylcyclohexylmethyl-3,4-epoxy - 1 - methylcyclohexanecarboxylate; 3,4 - epoxy - 2 - methylcyclohexylmethyl - 3,4-epoxy - 2 - methylcyclohexanecarboxylate; 3,4 - epoxy - 6-methylcyclohexylmethyl - 3,4 - epoxy - 6 - methylcyclohexanecarboxylate; 3,4 - epoxy - 3 - methylcyclohexylmethyl - 3,4 - epoxy - 3 - methylcyclohexanecarboxylate; and 3,4-epoxy-4-methylcyclohexylmethyl - 3,4 - epoxy - 4-methylcyclohexanecarboxylate.

II. Compounds having the general formula:

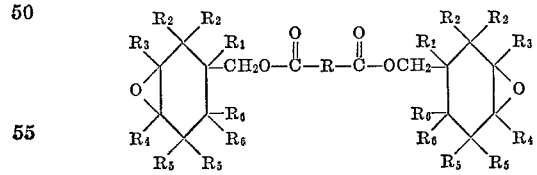

in which $R_1$, $R_2$, $R_3$, $R_4$, $R_5$ and $R_6$ represent a hydrogen atom or an alkyl radical and R represents a divalent aliphatic hydrocarbon radical. Examples of such compounds, which are disclosed in United States Patent 2,750,395, include bis(3-4-epoxycyclohexylmethyl)maleate; bis(3,4 - epoxycyclohexylmethyl)pimelate; bis(3,4-eopxy-6-methylcyclohexylmethyl)maleate; bis(3,4-epoxy-6 - methylcyclohexylmethyl)succinate; bis(3,4 - epoxycyclohexylmethyl)terephthalate; bis(3,4 - epoxycyclohexylmethyl)oxalate; bis(3,4 - epoxycyclohexylmethyl)succinate; and bis(3,4 - epoxy - 6 - methylcyclohexylmethyl) adipate.

III. Bis - epoxycyclopentanyl ether which has the formula:

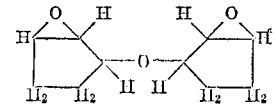

The preparation of this compound is disclosed in United States Patent 2,739,161.

IV. Compounds having the general formula:

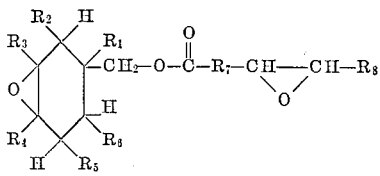

wherein the radicals $R_1$ through $R_6$ represent hydrogen atoms or alkyl groups, $R_7$ is an alkylene chain containing from 1 to 15 carbon atoms, and $R_8$ represents a hydrogen atom or an alkyl radical containing from 1 to 14 carbon atoms, the total number of carbon atoms in $R_7+R_8$ beeing from 7 to 15 carbon atoms. Examples of such compounds, which are disclosed in United States Patent 2,786,066, include 3,4-epoxycyclohexylmethyl 9,10-epoxymyristate; 3,4- epoxycyclohexylmethyl 9,10 - epoxypalmitate; 3,4 - epoxycyclohexylmethyl 9,10 - epoxystearate; 3,4-epoxy - 1 - methylcyclohexylmethyl 9,10 - epoxystearate; and 3,4-epoxy - 6 - methylcyclohexylmethyl 9,10-epoxystearate.

V. Compounds having the general formula:

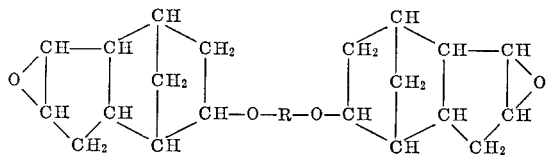

in which R is the radical of a glycol, HO·R·OH, such as ethylene glycol, or of a polyalkylene glycol, HO—R'—O—R'—OH, such as diethylene glycol such as disclosed in United States Patent 2,543,419.

VI. Compounds having the general formula:

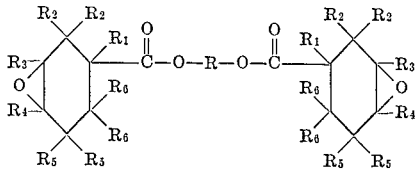

Such compounds are disclosed in United States Patents 2,745,847; 2,853,498 and 2,853,499. Some specific examples of these compounds include ethylene glycol bis(3,4-epoxycyclohexanecarboxylate); 3 - methyl - 1,5 - pentanediol bis(3,4 - epoxycyclohexanecarboxylate); 1,5 - pentanediol bis(3, 4 - epoxycyclohexanecarboxylate); 1,6-hexanediol bis(3,4 - epoxycyclohexanecarboxylate); 2-methoxymethyl - 2,4 - dimethyl - 1,5 - pentanediol bis(3,4-epoxycyclohexanecarboxylate); diethylene glycol bis(6-methyl - 3,4 - epoxycyclohexanecarboxylate); diethylene glycol bis(3,4 - epoxycyclohexanecarboxylate); and triethylene glycol bis(3,4-epoxcyclohexanecarboxylate).

Other diepoxy compounds having at least one fused ring epoxy group include limonene diepoxide

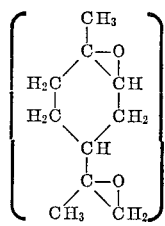

1,2,5,6-diepoxycyclooctane

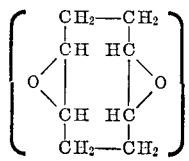

dicyclopentadiene diepoxide

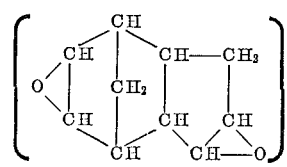

and vinylcyclohexene diepoxide

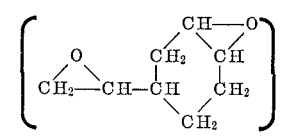

The reaction between the partial ester of a polycarboxylic acid which contains at least one unesterified carboxyl group with the polyepoxy compound may be conducted under various conditions. No catalyst is necessary to effect the reaction and it is preferred that none be present. However, the reaction proceeds more rapidly when heated. Proportions of reactants are not critical. It has been found convenient to use at least one mole of polyepoxide compound per unesterified carboxyl group per mole of the partial ester.

The following examples illustrate the preparation of various binders which may be used in the practice of this invention:

EXAMPLE I

Phthalic anhydride (1 mole) is admixed with the monomethyl ether of polyoxyethylene glycol having an average molecular weight of 750 (Carbowax 750) (1 mole). The admixture is heated with stirring for about 2 hours at 180° C. Then, 1.0 mole of 3,4-epoxy-6-methylcyclohexylmethyl 3,4-epoxy-6-methylcyclohexanecarboxylate (EP–201) is added to the reaction mixture and heating at 180° C. is continued for an additional 2 hours. A water soluble reaction product is obtained.

EXAMPLE II

Succinic acid (1 mole) is admixed with the monomethyl ether of polyoxythylene glycol having an average molecular weight of 550 (Carbowax 550) (1 mole). The admixture is heated with stirring for about 2 hours at 180° C. Then, 1.0 mole of vinyl cyclohexene diepoxide (EP–206) is added to the reaction mixture and heating at 180° C. is continued for an additional 2 hours. A water insoluble, emulsifiable reaction product is obtained.

EXAMPLE III

Phthalic acid (1 mole) is admixed with the monomethyl ether of polyoxyethylene glycol having an average molecular weight of 350 (Carbowax 350) (1 mole). The admixture is heated with stirring for about 2 hours at 180° C. Then, 1.0 mole of a dicyclopentadiene diepoxide (EP–207) is added to the reaction mixture and heating at 180° C. is continued for an additional 2 hours. A water insoluble, emulsifiable reaction product is obtained.

EXAMPLE IV

Maleic anhydride (1 mole) is admixed with the monomethyl ether of diethylene glycol (1 mole). The admixture is heated with stirring for about 1½ hours at 170° C. Then, 2.0 moles of dicyclopentadiene diepoxide (EP–207) are added to the reaction mixture and the mixture is heated at 180° C. for an additional 2 hours. A water insoluble, emulsifiable reaction product is obtained.

EXAMPLE V

Glutaric anhydride (1 mole) is admixed with the monomethyl ether of ethylene glycol (1 mole). The admixture is heated with stirring for about 2 hours at 180° C. Then, 2.0 moles of bis(3,4-epoxy-6-methylcyclohexyl)maleate are added to the reaction mixture and heating at 180° C. is continued for an additional 2 hours.

A water insoluble, emulsifiable reaction product is obtained.

EXAMPLE VI

Terephthalic anhydride (1 mole) is admixed with Carbowax 750 (1 mole). The admixture is heated with stirring for about 2 hours at 180° C. Then, 2.0 moles of bis(2,3-epoxycyclopentyl ether) are added to the reaction mixture and heating at 180° C. is continued for an additional hour. A water soluble reaction product is obtained.

EXAMPLE VII

Succinic anhydride (1 mole) is admixed with the monobutylether of triethylene glycol (1 mole). The admixture is heated with stirring for about 2 hours at 180° C. Then, 1.0 mole of 3,4-epoxycyclohexylmethyl 3,4-epoxycyclohexanecarboxylate is added to the reaction mixture and heating at 180° C. is continued for an additional 2 hours. A water insoluble, emulsifiable reaction product is obtained.

Example VIII

Phthalic anhydride (1 mole) is admixed with ethanol (1 mole). The admixture is heated with stirring for about 2 hours at 180° C. Then, 1.0 mole of Epon 828 is added to the reaction mixture and heating at 180° C. is continued for an additional 2 hours. A water dispersible reaction product is obtained.

EXAMPLE IX

Tricarballylic acid (1 mole) is admixed with Carbowax 550 (2 moles). The admixture is heated with stirring for about 2 hours at 180° C. Then, 1.0 mole of vinyl cyclohexene diepoxide is added to the reaction mixture and heating at 180° C. is continued for an additional 2 hours. A water dispersible reaction product is obtained.

EXAMPLE X

Aconitic acid (1 mole) is admixed with the monomethyl ether of polyoxyethylene glycol having an average molecular weight of 750 (Carbowax 750) (1 mole). The admixture is heated with stirring for about 2 hours at 180° C. Then, 2.0 moles of 3,4-epoxy-6-methylcyclohexylmethyl 3,4-epoxy-6 - methylcyclohexanecarboxylate (EP–201) are added to the reaction mixture and heating at 180° C. is continued for an additional 2 hours. A water soluble reaction product is obtained.

EXAMPLE XI

Pyromellitic acid (1 mole) is admixed with the monomethyl ether of polyoxyethylene glycol having an average molecular weight of 550 (Carbowax 550) (2 moles). The admixture is heated with stirring for about 2 hours at 180° C. Then, 2.0 moles of vinyl cyclohexene diepoxide (EP–206) are added to the reaction mixture and heating at 180° C. is continued for an additional 2 hours. A water insoluble, emulsifiable reaction product is obtained.

EXAMPLE XII

Mellitic acid (1 mole) is admixed with the monomethyl ether of polyoxyethylene glycol having an average molecular weight of 350 (Carbowax 350) (4 moles). The admixture is heated with stirring for about 2 hours at 180° C. Then, 2.0 moles of a dicyclopentadiene diepoxide (EP–207) are added to the reaction mixture and heating at 180° C. is continued for an additional 2 hours. A water insoluble, emulsifiable reaction product is obtained.

EXAMPLE XIII

Aconitic acid (1 mole) is admixed with the monomethyl ether of diethylene glycol (1 mole). The admixture is heated with stirring for about 1½ hours at 170° C. Then, 2.0 moles of dicyclopentadiene diepoxide (EP–207) are added to the reaction mixture and the mixture is heated at 180° C. for an additional 2 hours. A water insoluble, emulsifiable reaction product is obtained.

EXAMPLE XIV

Rosin (1 mole, 400 grams) is added to maleic anhydride (1 mole, 100 grams) and heated for 30 minutes at 230° C. with stirring in a flask equipped with a condenser. The resultant reactant product is allowed to cool to room temperature, at which temperature it is a solid. The solid maleic anhydride rosin adduct is pulverized and mixed wtih solid particles of Carbowax 750 (1 mole). The admixture is heated with stirring for 2 hours at 200° C. Then, 2.0 moles of vinyl cyclohexene diepoxide (EP–206) are added to the reaction mixture and heating at 200° C. is continued for another 3 hours. A water insoluble, emulsifiable reaction product is obtained.

EXAMPLE XV

The procedure of Example XIV is followed with the exception that 2 moles of EP–201 for the 2 moles of EP–206. A water soluble, reaction product is obtained.

EXAMPLE XVI

The procedure of Example XIV is followed with the exception that linseed oil acid is substituted for rosin. A water insoluble, emulsifiable reaction product is obtained.

EXAMPLE XVII

The procedure of Example XVI is followed with the exception that 2 moles of EP–201 is substituted for the 2 moles of EP–206. A water soluble reaction product is obtained.

EXAMPLE XVIII

Citric acid (1 mole) is admixed with Carbowax 750 (1 mole). The admixture is heated wtih stirring for about 2 hours at 180° C. Then, 2.0 moles of bis(2,3-epoxycyclopentyl ether) are added to the reaction mixture and heating at 180° C. is continued for an additional hour. A water soluble reaction product is obtained.

EXAMPLE XIX

Oxalocitraconic acid (1 mole) is admixed with the monobutylether of triethylene glycol (1 mole). The admixture is heated with stirring for about 2 hours at 180° C. Then, 2.0 moles of 3,4-epoxycyclohexylmethyl 3,4-epoxycyclohexanecarboxylate are added to the reaction mixture and heating at 180° C. is continued for an additional 2 hours. A water insoluble, emulsifiable reaction product is obtained.

EXAMPLE XX

The maleic acid-rosin adduct of Example XIV (1 mole) is admixed with ethanol (1 mole). The admixture is heated with stirring for about 2 hours at 180° C. Then, 2.0 moles of Epon 828 are added to the reaction mixture and heating at 180° C. is continued for an additional 2 hours. A water insoluble, emulsifiable reaction product is obtained.

EXAMPLE XXI

Tricarballylic acid (1 mole) is admixed with Carbowax 550 (1 mole). The admixture is heated with stirring for about 2 hours at 180° C. Then, 2.0 moles of vinyl cyclohexene diepoxide are added to the reaction mixture and heating at 180° C. is continued for an additional 2 hours. A water dispersible reaction product is obtained.

The aqueous sizing composition is formulated so that it contains from about 1 to 8 percent by weight of the previously described binder, from about 0.3 to about 2.0 percent by weight of a coupling agent and from about 0.1 to 1 percent by weight of a glass fiber lubricant.

Coupling agents which may be used in the aqueous size compositions in the practice of this invention include silane and siloxane materials. For example, hydrolyzable vinyl, allyl, beta-chloropropyl, phenyl, thioalkyl, thioalkaryl, aminoalkyl, methacrylate, epoxy and mercapto silanes, their hydrolysis products and polymers of the hydrolysis products and mixtures of any of these are suitable for such use. Some of the silanes are disclosed in U.S. Patents Nos. 2,563,288; 2,688,006; 2,688,007; 2,723,211; 2,742,378; 2,754,237; 2,776,910; 2,799,598; 2,832,754; 2,930,809; 2,946,701; 2,952,576; 2,974,062; 3,044,982; 3,045,036; 3,169,884; 3,207,623 and 3,211,684, the disclosures of which are incorporated herein by reference.

Another class of coupling agents which has been found to be useful are the basic (hydroxy containing) metal salts of a strong mineral acid, such as, for example, a basic chromium chloride, basic chromium sulfate, etc. These compounds are ones having a trivalent metal ion selected from the group consisting of chromium, cobalt, nickel, copper and lead, at least one hydroxyl group attached to the metal, and at least one anion of a strong mineral acid attached to the metal (as well as coordinate complexes of these compounds and mixtures thereof).

Another type of coupling agent which may be used in the practice of this invention is a complex compound of the Werner type in which a trivalent nuclear atom, such as chromium, is coordinated with an organic acid such as methacrylic acid, i.e., a methacrylic acid complex of chromic chloride. Such agents are described in U.S. Patent No. 2,611,718.

Mixtures of two or more of any of these coupling agents may be used.

It is frequently desirable to employ a melamine-formaldehyde resin in admixture with the resinous binder in the size composition. The addition of about 0.3 to 2 percent by weight of a melamine-formaldehyde resin provides improved color and helps to control the hardness of the sized strand.

The glass fiber lubricant for use in the present invention may be a cationic-active, acid solubilized, fatty acid amide. A suitable material is the pelargonic acid amide of tetraethylene pentamine which is manufactured by Imperial Chemical Industries under the trademark Cirrasol-185. It is an anhydrous material which is a deep reddish, amber viscous liquid at room temperature. It is water dispersible and has a pH of 8.9 to 9.4 in a one percent by weight aqueous dispersion. Other commercially available acid solubilized, fatty acid amides are useful as glass fiber lubricants in the practice of this invention. These include both saturated and unsaturated fatty acid amides wherein the acid group contains from 4 to 24 carbon atoms. Also included are anhydrous, acid solubilized polymers of the lower molecular weight unsaturated fatty acid amides. The glass fiber lubricant is employed in an amount approximately 0.1 to 1 percent by weight of the sizing solution.

Another glass fiber lubricant which can be used in the size is an alkyl imidazoline derivative which includes compounds of the class u-alkyl N-amidoalkyl imidazolines which may be formed by causing fatty acids to react with polyalkylene polyamines under conditions which produce ring closure. The reaction of tetraethylene pentamine with stearic acid is exemplary of such reaction. These imidazolines are described more fully in U.S. Patent No. 2,200,815. Other suitable imidazolines are described in U.S. Patents Nos. 2,267,965; 2,268,273 and 2,355,837.

The above cationic lubricants may be used in combination with or replaced by a quaternary pyridinium compound which may be represented by the general formula:

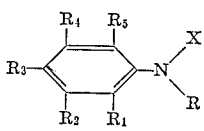

wherein X is an anion; R is an organic group containing from 1 to 30 carbon atoms selected from the group consisting of alkyl, arylalkyl, aryl, alkenyl and acyl; and $R_1$, $R_2$, $R_3$, $R_4$ and $R_5$ are each members selected from the group consisting of hydrogen, alkyl, aryl, arylalkyl, heterocyclic, halogen, alkenyl, carboxylic, alkoxy, ketonic, amido, and substituted amido. Thus, the anionic group X may be, for example, chloro, fluoro, iodo, bromo, hydroxyl, nitrate, sulfate, phosphate, etc. The group R may be, for example, methyl, ethyl, butyl, hexyl, lauryl, oleyl, benzyl, phenyl, acetyl, propionyl, benzoyl, etc. The groups $R_1$, $R_2$, $R_3$, $R_4$ and $R_5$ may be, for example, methyl, ethyl, propyl, cyclohexyl, furyl, pyrryl, benzyl, phenyl, chloro, bromo, iodo, fluoro, oleyl, methoxy, acetoxy, benzoxy, acetonyl, acetamido, etc. These compounds are prepared in accordance with methods common in the art by the quaternization of the corresponding pyridine bases such as pyridine, niacin, nicotinamide, nicotine, nicotyrine, nikethamide, 2 - benzylpyridine, 3,5 - dibromopyridine, 4 - chloropyridine, 3 - ethylpyridine, 4-methoxypyridine, 3 - phenylpyridine, 2 - picoline, 3-picoline, 4-picoline, 2-picoline-4,6-dicarboxylic acid, 2,4-lutidine, 2,6-lutidine, 3,4-lutidine, 2,4-pyridine dicarboxylic acid, 4-ethyl-3-methylpyridine, 3-ethyl-4-methylpyridine, 2,4,6-trimethylpyridine, etc.; with for example, an alkyl halide. In a preferred embodiment, the R group in the above formula is an aliphatic hydrocarbon radical containing from 4 to 18 carbon atoms.

The size may contain a wetting agent. The wetting agent is preferably cationic or nonionic and it may also serve as an additional lubricant. Any material which is conventionally known to be useful as such and will reduce the surface tension of the sizing solution so that it is about 25 to 35 dynes per square centimeter can be used. Such materials include cetyl or stearyl monoamine hydrochloride or acetate, dodecyl amine, hexadecyl amine and secondary and tertiary derivatives of the same, for example, dodecyl methyl amine and salts thereof. Other examples of suitable wetting agents are polyoxyethylene derivatives of a soribtol fatty acid ester such as polyoxyethylene sorbitan monostearate or polyoxyethylene sorbitan trioleate. The amount of such wetting agent employed generally ranges from about 0.01 to 1 percent by weight of the aqueous sizing solution.

The total solids (nonaqueous) content of the sizing solution is about 2 to 15 percent by weight of the solution. In all events the amounts of the various ingredients should not exceed that amount which will cause the viscosity of the solution to be greater than about 100 centipoises at 20° C. Solutions having a viscosity of greater than 100 centipoises at 20° C. are very difficult to apply to glass fiber strands during their formation without breaking the strand. It is preferred that the viscosity of the size be between 1 and 20 centipoises at 20° C. for best results. The pH of the solution may generally vary from about 3 to 8.

Typical examples of the size are as follows.

EXAMPLE XXII

| Ingredient: | Parts by weight |
|---|---|
| Reaction product of Example XV | 80.0 |
| Hydrogenated tallow acid reacted with hydroxyethyl ethylene diamine (A–14) (lubricant) | 2.0 |
| Gamma-aminopropyltriethoxysilane | 10.0 |
| Aqueous solution of melamine formaldehyde resin (65% by weight solids) (RD–140) | 10.6 |
| Lauryl pyridinium chloride | 5.0 |
| Water | 1900.0 |

Two hundred fifty-five gallons of the glass fiber size can be made by dispersing the reaction product of Example XV in about 1.6 gallons of water in a mixing tank. The fiber glass lubricant is added to about 7 gallons of water maintained at a temperature of about 130° to 160° F. and thoroughly mixed therein. This mixture is then added to the aqueous dispersion of the binder. The gamma-aminopropyl triethoxysilane is mixed separately with four times its weight of cold water, and then added immediately, say for example within ten minutes, to the mixing tank. The melamine formaldehyde resin and lauryl pyridinium chloride are then mixed separately with about eight times their weight of water and are then added to the mixture. Sufficient water is added to make 250 gallons of sizing solution. The sizing solution as thus prepared has a pH of about 6.5 to 6.9 and a solids content of about 6.0 to 7.0 percent by weight.

EXAMPLE XXIII

| Ingredient: | Parts by wt. |
|---|---|
| Reaction Product of Example XIV | 100.0 |
| Pluronic F–108 (surface-active) (reaction product of ethylene oxide and polypropylene glycol) | 10.0 |
| Gamma-methacryloxypropyl trimethoxysilane (DC–6030 sold by Dow Corning or A–174 sold by Union Carbide | 11.0 |
| Acetic acid | 0.0013 |
| Gamma-aminopropyltriethoxysilane | 5.5 |
| Glass fiber lubricant (A–14) | 2.0 |
| Aqueous solution of melamine formaldehyde resin (65% by weight solids) | 12.0 |
| Lauryl pyridinium chloride | 6.0 |
| Water | 1930.0 |

The sizing solution listed above is prepared and applied to the individual glass fibers during their formation in the conventional manner. The sizing solution is applied to the individual fibers just after their emergence from orifices in an eletcrically heated, platinum alloy bushing containing molten glass. The sizing solution is applied to the filaments prior to the time they are grouped together to form a strand by means of a roller applicator which is partially submerged in the sizing solution contained in a reservoir. Such an applicator is shown in more detail in U.S. Patent No. 2,728,972. The fibers are grouped into a strand by a graphite guide and wound around a forming tube rotating at approximately 7500 r.p.m. to produce a strand travel of approximately 12,000 to 15,000 feet per minute. Other methods of applying the size to the strand of glass fibers, such as a pad applicator, may be employed and the strand may be formed by means other than winding on the forming tube, such as by means of a pair of rotating wheel pullers which direct the strand into a suitable collecting device.

The glass fiber strands wound on the forming tube are then dried. This may be done by heating them at a temperature and for a length of time sufficient to remove substantially all of the water, for example at about 275° F. for 8 hours. This drying causes the coupling agents to fix themselves to the glass surface and to produce the degree of strand integrity required for forming the strand into a woven cloth or woven roving. The solids content of size on the strands averages about 0.3 to 2.0 percent by weight, preferably about 0.50 percent by weight.

The strands which have been sized and fabricated as described above have excellent "wet-out" properties and provide increased physical strengths to resins reinforced with the strands or with cloth woven from the strands. Rods formed by impregnating E-glass roving with Selectron 5003–L polyester resin and molding several lengths thereof in an aluminum tube at 235° F. for 30 minutes were tested for compressive strength. The rods were cut into short lengths and tested in accordance with the procedure and calculations found in the "Standard Method of Test for Compressive Properties of Rigid Plastics," ASTM designation: D695–54. The reinforced polyester test rods contained 50 percent by weight of glass and had an average dry compression strength of 85,253 pounds per square inch. Other samples which were immersed in boiling water for three hours and tested in the same manner had an average compression strength of 72,124 pounds per square inch.

Glass strands sized and fabricated in the manner described in Example XXIII above were also subjected to the Naval Ordnance Laboratory's Split D Ring Test. This test consists of winding glass strands saturated with resin into a cylindrical form approximately six inches in diameter. The glass plastic cylinder is cured for 16 hours at 250° F. and for an additional 4 hours at 360° F. After curing, ring sections six inches in diameter, one-quarter inch wide, and one-eighth inch thick are cut from the cylinder. These are tested for tensile strength by placing two D-shaped members within the ring and causing the D-shaped members to be pulled in diametrically opposing directions until the filament wound ring breaks.

E-glass strands sized with the formulation described in Example XXIII were saturated with epoxy resin and tested in accordance with the Naval Ordnance Laboratory's Split D Ring Test procedure. These had an average dry ultimate tensile strength of 305,000 pounds per square inch. Other rings, similarly prepared, after immersion in boiling water for 3 hours and tested in the same manner had an average ultimate tensile strength of 280,600 pounds per square inch. For comparative purposes presently commercially available E-glass strands subjected to the same fabrication and testing technique with the exception that they were sized with an epoxy compatible size formulation rather than the formulation described in Example XXIII had an average dry ultimate tensile strength of only 282,000 pounds per square inch and samples immersed in boiling water for three hours had an average ultimate tensile strength of only 272,130 pounds per square inch.

Additional strength tests were also conducted on fiber glass cloth woven from plied yarn treated as described in Example XXIII. The cloth was woven on a Crompton and Knowles C–4 loom in a taffeta pattern resulting in 18 ends of 400 filament glass strand per inch in both the warp and fill. Twelve plies of the cloth were individually saturated with Selectron 5003 polyester resin and stacked upon each other. The assembly was cured for 20 minutes at 180° F. under 50 pounds per square inch pressure, and postcured for one hour at 235° F. at atmospheric pressure. The resulting laminates containing approximately 64 percent glass were tested and found to have the following average strengths, 54,500 pounds per square inch dry tensile strength, 42,400 pounds per square inch dry flexural strength and 25,600 pounds per square inch dry compressive strength. Additional fiber glass cloth reinforced laminates prepared in the same manner but immersed in boiling water for three hours prior to testing had the following average strengths, 51,200 pounds per square inch tensile strength, 37,800 pounds per square inch flexural strength, and 22,200 pounds per square inch compressive strength.

However, increased physical strength although an important and significant factor, represents only one benefit to be derived through the use of the subject sizes. Other equally beneficial and desirable aspects are the versatility and economic advantages obtained through the use of these sizes. Prior to introducing cloth woven from fiber glass strands having starch based sizes thereon into resins for reinforcement purposes, it is necessary to remove the size by literally burning it off in a heat cleaning process and subsequently apply a coupling agent to the filaments to serve as a "coupler" between the reinforcing fibers and the resin. These additional treatments involve a substantial investment in equipment and additional expense in maintenance and operation of such equipment. One substantial benefit obtained through the use of the size formulations disclosed in the preceding and subsequent examples is that one need not subject fiber glass cloth woven from yarn treated with these sizes to the costly heat cleaning and coupling agent treatments. One need only take the cloth woven from fiber glass yarns treated with the subject sizes, saturate it with the desired resin and shape or form said saturated cloth to whatever configuration is desired by conventional molding or laminating techniques. Thus, fabricators manufacturing resinous articles reinforced with fiber glass cloth can, through The two-step drying and curing process provides improved uniformity and impregnation of the coating on the strands. This is evidenced by a uniformity of amount and coloring of the coating on the strands and the absence of "flags" or lumps of adhesive along the length of the coated strand as is the case with conventional coating techniques. This in turn provides markedly improved "flex life" of the rubber product which is reinforced with the coated strands. The two-step coating process also permits coating of the adhesive at a much faster rate than conventional coating processes which do not utilize the dielectric or microwave drying step.

Experimentation is usually necessary to determine the optimum cord construction and adhesive for the particular rubber product. In this experimentation, various screening tests are utilized to determine the properties of the reinforced rubber. The "H-Adhesion" test is a standard rubber industry test designated as ASTM D-2138-62T issued in 1964.

The following rubber compounds were reinforced with glass fiber cord of ECG-75 5/3 4.0 Z x 3.0 S construction and tested. The individual fibers were formed and sized as described in Example XXIII and the strands were coated as described in Example XXVIII. The chemical identification of the ingredients in the rubber compound can be found in "Materials and Compounding Ingredients for Rubber and Plastics," published by Rubber World.

EXAMPLE XXIX

|  | Styrene-butadiene-rubber | | | |
|---|---|---|---|---|
|  | A | B | C | D |
| Compound | 41405 | 41408 | 41409 | 41410 |
| SBR 1502 | 100.0 | 100.0 | 100.0 | 100.0 |
| Furnex | 40.0 | 40.0 | 40.0 | 40.0 |
| ZnO | 3.0 | 3.0 | 3.0 | 3.0 |
| Thermoflex A | 1.0 | 1.0 | 1.0 | 1.0 |
| Stearic acid | 1.0 | 1.0 | 1.0 | 1.0 |
| Pine tar | 3.0 | 3.0 | 3.0 | 3.0 |
| Santocure | 1.4 | 0.4 |  |  |
| Altax |  |  | 1.4 | 0.6 |
| DOTG |  |  |  | 0.6 |
| M. Tuad |  | 0.3 |  |  |
| Sulfur | 2.5 | 2.5 | 2.5 | 2.5 |

"H-Adhesion" test at 230° F. for 30 minutes (average 18 to 22 pounds)

EXAMPLE XXX

|  | Natural rubber | | | | | | |
|---|---|---|---|---|---|---|---|
|  | E | F | G | H | I | J | K |
| Compound | 41726 | 41727 | 41728 | 41729 | 41730 | 41731 | 41732 |
| #IRSS | 100.0 | 100.0 | 100.0 | 100.0 | 100.0 | 100.0 | 100.0 |
| SRF | 75.0 | 75.0 | 75.0 |  |  |  | 75.0 |
| EPC |  |  |  | 50.0 | 50.0 | 50.0 |  |
| MgO | 5.0 | 5.0 |  |  |  |  | 5.0 |
| ZnO | 5.0 | 5.0 | 5.0 | 5.0 | 5.0 | 5.0 | 5.0 |
| Aminox | 1.0 | 1.0 | 1.0 | 1.0 | 1.0 |  | 1.0 |
| PBNA |  |  |  |  |  | 1.0 |  |
| Stearic acid | 1.0 | 1.0 | 1.0 | 1.0 | 1.0 | 1.0 | 1.0 |
| Pine tar |  |  |  |  |  | 3.0 |  |
| Flexon 640 |  | 3.0 | 3.0 | 3.0 | 3.0 |  |  |
| Amax | 1.25 | 1.25 | 1.25 | 1.25 |  |  |  |
| Altax | 0.25 | 0.25 | 0.25 | 0.25 |  |  |  |
| Castax |  |  |  |  | 1.0 | 1.0 | 1.0 |
| Sulfur | 2.5 | 2.5 | 2.5 | 2.5 | 2.5 | 2.5 | 2.5 |

"H-Adhesion" test at 230° F. for 30 minutes (average 24 pounds).

EXAMPLE XXXI

|  | Natural Rubber (passenger car stock) | |
|---|---|---|
|  | L | M |
| Compound | 41971 | 41972 |
| #IRSS | 50.0 | 50.0 |
| SBR | 50.0 | 50.0 |
| Reclaim B 1772 | 30.0 | 30.0 |
| Philblack A | 40.0 |  |
| Hi-Sil 233 |  | 40.0 |
| Stearic acid | 2.0 |  |
| ZnO | 3.0 | 4.0 |
| PBNA | 1.0 | 1.0 |
| Paraflux 2016 | 6.0 | 6.0 |
| Sundex 53 |  | 10.0 |
| Sulfur | 2.6 | 2.6 |
| Santocure N/S | 1.0 |  |
| DOTG |  | 1.2 |
| Altax |  | 0.8 |
| Tea |  | 1.0 |

"H-Adhesion" test at 230° for 30 minutes (average 20 pounds).

EXAMPLE XXXII

|  | Neoprene | | | |
|---|---|---|---|---|
|  | N | O | P | Q |
| Compound | 41469 | 41470 | 41471 | 41472 |
| Neoprene W | 100.0 | 100.0 | 100.0 | 100.0 |
| Furnex | 30.0 | 30.0 | 30.0 | 30.0 |
| Stearic acid | 1.0 | 1.0 | 1.0 | 1.0 |
| Akroflex CD | 1.0 | 1.0 | 1.0 | 1.0 |
| MgO | 3.0 | 3.0 | 3.0 |  |
| Circo Lt | 5.0 | 5.0 | 5.0 | 5.0 |
| NA-22 | 0.5 | 0.5 | 0.25 | 0.5 |
| Altax |  | 1.0 |  |  |
| ZnO | 5.0 | 5.0 | 3.0 | 5.0 |

"H-Adhesion" test at 230°F. for 30 minutes (average 20 pounds).

Additional adhesive compositions which have been utilized in the practice of the invention are as follows:

EXAMPLE XXXIII

An adhesive dip composition especially useful for cords which are to reinforce natural rubber and SBR stocks is as follows.

| Ingredient: | Parts by wt. |
|---|---|
| Butadiene-styrene latex (70% butadiene, 30% styrene by weight) | 7800 |
| Resorcinol | 350 |
| Formaldehyde | 518 |
| NaOH | 9.6 |
| Water | 9572 |

This adhesive dip is prepared in the same manner as the adhesive in Example XXVIII with the exception that $NH_4OH$ is omitted. The latex appears to act as a sufficient inhibitor to condensation of the resorcinol and formaldehyde to permit absence of $NH_4OH$.

EXAMPLE XXXIV

An adhesive dip composition especially useful for cords which are to reinforce Neoprene rubber stock is a follows:

| Ingredient | Percent solids | Parts by weight |
|---|---|---|
| Neoprene latex (Du Pont latex 460) | 46 | 6,300 |
| MgO | 33 | 315 |
| Tergitol Anionic (Surfactant-Stabilizer) |  | 63 |
| Neozone-D (antioxidant which prevents breakdown of Neoprene at high temperature, β-phenylnaphthyl (amine) | 50 | 126 |
| ZnO | 50 | 315 |
| Resorcinol |  | 99 |
| Formaldehyde | 37 | 145.8 |
| NaOH |  | 36 |
| $H_2O$ |  | 2,145.6 |

This adhesive is prepared in the same manner as in Example XXVIII and is aged for 24 hours at room temperature before use.

the use of cloth woven from fiber glass yarn treated with the subject sizes, produce such reinforced articles with either polyester or epoxy resins without suffering the expense of heat cleaning or coupling agent treatments.

While preparing samples for the strength tests described above, it was noted that the subject resin formulations possessed superior "wet-out" characteristics. That is, the rate at which the resin flows among the filaments of the glass strands giving maximum transparency to the resin glass mixture was relatively high. While preparing roving reinforced rods for compressive strength testing, the size formulation described in Example XXIII required only 25 seconds to wet the filaments and obtain maximum transparency, whereas 30 seconds is considered to be an exceptionally fast "wet-out" time.

Further examples of the sizing solutions which may be employed in the present invention are listed below.

EXAMPLE XXIV

| Ingredient: | Parts by wt. |
|---|---|
| Reaction product of Example I | 85.0 |
| Gamma-aminopropyltriethoxysilane | 5.5 |
| Aqueous solution of melamine-formaldehyde resin (65% by weight solids) | 11.0 |
| Tetraethylene pentamine amide of stearic acid solublized in water with methacrylic acid | 5.0 |
| Lauryl pyridinium chloride | 6.0 |
| Water | 1942.0 |

EXAMPLE XXV

| Ingredient: | Parts by wt. |
|---|---|
| Reaction product of Example III | 80.0 |
| Pluronic F-108 | 8.0 |
| Volan (a 20% by weight solution of the methacrylic acid complex of chromic chloride and isopropyl alcohol and acetone) | 76.0 |
| Zinc stearate | 38.0 |
| Cation X (textile lubricant in the form of a paste containing 33% by weight of solids in water) | 29.0 |
| Arquad S (a wetting agent containing 60% by weight of active ingredients in isopropanol) | 2.0 |
| Water | 3785.0 |

EXAMPLE XXVI

| Ingredient: | Parts by wt. |
|---|---|
| Reaction product of Example V | 90.0 |
| Pluronic F-108 | 9.0 |
| Glycidoxypropyltrimethylsilane (DC-Z-6040 sold by Dow Corning) (A-187 sold by Union Carbide) | 5.0 |
| Textile lubricant (A-14) | 5.0 |
| Aqueous solution of melamine formaldehyde resin (65% by weight) | 11.0 |
| Lauryl pyridinium chloride | 6.0 |
| Water | 1942.0 |

EXAMPLE XXVII

| Ingredient: | Parts by wt. |
|---|---|
| Reaction product of Example X | 80.0 |
| Pelargonic acid amid solubilized in water with acetic acid (Cirrasol-185) | 4.5 |
| Gamma-aminopropyltriethoxysilane | 19.0 |
| Water | 1900.0 |

The sized strands herein described are particularly useful as a reinforcement for rubber. In such use, a plurality of ends of strand or yarn are combined and coated with a rubber adhesive. The coated ends are twisted and then plied with other coated ends to form a coated cord. For example, five ends of ECG-75s with a one-half turn twist may be combined and coated and impregnated with a rubber latex adhesive. The coated ends are heated to dry the adhesive and fix it on the combined ends of yarn. The coated ends are then twisted to impart a 4Z twist. The twisted ends are then plied with other twisted ends to give a blanced 3.0 S plied cord. Typical cords are 5/4 for belt reinforcement and 5/3 for tire reinforcement. The cords are used as such or in a loosely woven fabric form. The fabric is used in the belt portion of radial ply tires.

It has been found that different adhesives must be used with different synthetic fibers to get maximum properties in different rubber stocks. A satisfactory adhesive for glass fibers and rubber is a mixture of resorcinol, formaldehyde and a terpolymer of butadiene, styrene and vinyl pyridine such as shown in U.S. Patent No. 2,817,616. Other suitable formulations are described in U.S. Patents Nos. 2,691,614 and 2,822,311. The formulation of a suitable rubber adhesive and the coating of glass fiber strand and yarn therewith are described in the following example:

EXAMPLE XXVIII

A rubber adhesive is prepared from the following ingredients.

| Ingredients: | Parts by wt. |
|---|---|
| Resorcinol | 352 |
| $CH_2O$ (37%) aqueous solution | 518 |
| NaOH | 9.6 |
| Butadiene-styrene-vinyl pyridine terpolymer latex (Gen-Tac 41% solids dispersed in $H_2O$) | 7800 |
| $NH_4OH$ (28% $NH_3$ in $H_2O$) | 362 |
| $H_2O$ | 9572 |

These ingredients are mixed in the following manner. The Gen-Tac terpolymer latex is mixed with 1940 parts by weight of water. Water (7632 parts by weight) is added to a separate container. NaOH is then added and dissolved therein. Formaldehyde is added after the resorcinol is next added to the aqueous solution of NaOH and dissolved therein. Formaldehyde is added after the resorcinol and the mixture is stirred for 5 minutes and allow to age at room temperature for two to six hours. The aging permits a small amount of condensation of resorcinol and formaldehyde and provides superior "H" test adhesion of the subsequently coated yarn to the rubber stock. After aging, this mixture is added to the Gen-Tac latex and the resultant mixture is stirred slowly for 15 minutes. Ammonium hydroxide is then added and the mixture is stirred slowly for 10 minutes. The ammonium hydroxide inhibits further condensation of the resorcinol formaldehyde.

Glass fiber strands produced as described in Example XXIII were coated and impregnated with the adhesive produced as above described. Five strands (ECG-75s) with one-half turn per inch of twist are combined in parallel relation and passed under slight tension through grooves in rotating rollers which are partially suspended in the adhesive. The pickup of adhesive is sufficient to provide a coating on the strands of about 10 to 25 percent by weight of adhesive based upon the weight of strands. Fifteen percent (15%) by weight of adhesive has been found to be suitable for most purposes.

Thereafter, the coated strands are passed vertically through a dielectric or microwave drying oven to remove the water and $NH_3$ from the adhesive. During this removal the strands appear to vibrate vigorously and further impregnation of the adhesive into the strands and onto and around the individual fibers is achieved. The coated strands next pass upwardly through a gas oven maintained at a temperature of about 350° to 500° F. to effect curing of the resorcinol formaldehyde. Further flowing and impregnating of the adhesive is accomplished during this second heating step. The curing or condensing of the resorcinol formaldehyde is free to proceed with the removal of the $NH_3$. The condensation is time-temperature dependent. For example, heating the coated strands for 30 seconds at 370° F. or 20 seconds at 420° F. is satisfactory. Apparatus suitable for performing the two-step heat treatment is shown in U.S. Patent No. 2,865,790.

EXAMPLE XXXV

An adhesive dip composition especially useful for Neoprene rubber stock is as follows:

| Ingredient | Percent solids | Parts by weight |
|---|---|---|
| Neoprene latex (Du Pont latex 460) | 46 | 4,176 |
| Butadiene-styrene-vinyl pyridine latex | 41 | 1,171 |
| MgO | 33 | 315 |
| NH₄OH | 28 | 271 |
| Resorcinol | | 264 |
| Formaldehyde | | 389 |
| NaOH | | 7.2 |
| H₂O | | 12,570 |

The adhesive dip composition is prepared in the same manner as described in Example XXVIII.

Although the present invention has been described with respect to specific details of certain embodiments thereof, it is not intended that such details act as limitations upon the scope of the invention except insofar as set forth in the accompanying claims.

We claim:

1. In the method of forming a glass fiber strand which can be used as a reinforcement for resins and rubber which comprises drawing glass streams through orifices in a bushing to form individual glass fibers, moving the fibers away from the bushing at a high rate of speed and forming them into a strand, applying to the fibers while they are moving at this speed an aqueous sizing solution, drying the sized glass fibers and preparing them for use as a reinforcement, the improvement which comprises utilizing an aqueous size which consists essentially of from about 1 to about 8 percent by weight of a binder obtained by reacting a partial ester of polycarboxylic acid which contains at least one unesterified carboxyl group with a compound containing more than one epoxy group per molecule; and partial ester being the reaction product of a polycarboxylic acid or the anhydride thereof containing $n$ carboxyl groups and less than $n$ moles of a monohydric compound, $n$ being a whole number greater than one; from about 0.3 to about 2 percent by weight of a coupling agent; and from about 0.1 to about 1.0 percent by weight of a glass fiber lubricant, the total solids content of the solution being 2 to 15 percent by weight and the viscosity of the solution being less than 100 centipoises at 20° C.

2. The method of claim 1 wherein said partial ester of a polycarboxylic acid is a glycol monoalkylether ester of a polycarboxylic acid.

3. The method of claim 1 wherein the sized strand is further prepared for rubber reinforcement by coating it with an aqueous rubber adhesive composition containing a rubber latex and a heat curable resin, the adhesive coated strand is dried by means of high frequency electrical energy to remove the water and the resin is thereafter cured by the application of additional heat.

4. Glass fiber strand formed according to the method of claim 1.

References Cited

UNITED STATES PATENTS

| | | |
|---|---|---|
| 2,890,197 | 6/1959 | Phillips et al. |
| 2,985,616 | 5/1961 | McGary et al. _____ 260—31.2 |
| 3,027,341 | 3/1962 | Boucher et al. _____ 260—29.2 |
| 3,031,434 | 4/1962 | Radlove. |
| 3,107,226 | 10/1963 | Tonner et al. |
| 3,116,192 | 12/1963 | Eilerman. |
| 3,219,603 | 11/1965 | Scheibli. |
| 3,249,412 | 5/1966 | Kolek et al. _____ 65—3 |
| 3,284,179 | 11/1966 | Eilerman _____ 65—3 |
| 3,293,058 | 12/1966 | Evans et al. ____ 260—29.2 XR |

DONALL H. SYLVESTER, *Primary Examiner.*

F. W. MIGA, *Assistant Examiner.*

U.S. Cl. X.R.

65—60, 3; 117—76; 161—185; 260—78.4, 29.2